United States Patent
Bouchard et al.

(10) Patent No.: US 7,191,213 B1
(45) Date of Patent: Mar. 13, 2007

(54) INSTANT MESSAGE NOTIFICATION APPLICATION

(75) Inventors: Louis Bouchard, Santa Cruz, CA (US); Dustin M. Donaldson, Fremont, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 1343 days.

(21) Appl. No.: 09/697,113

(22) Filed: Oct. 25, 2000

Related U.S. Application Data

(60) Provisional application No. 60/169,735, filed on Dec. 8, 1999.

(51) Int. Cl.
*G06F 15/16* (2006.01)

(52) U.S. Cl. .................................................. 709/204

(58) Field of Classification Search ......... 709/204–207
See application file for complete search history.

(56) References Cited

U.S. PATENT DOCUMENTS

| | | | | |
|---|---|---|---|---|
| 5,668,863 | A | | 9/1997 | Bieselin et al. ............. 379/202 |
| 5,922,045 | A | | 7/1999 | Hanson ....................... 709/206 |
| 5,949,776 | A | | 9/1999 | Mahany et al. ............. 370/338 |
| 6,199,076 | B1 | | 3/2001 | Logan et al. ................ 707/501 |
| 6,289,212 | B1 | | 9/2001 | Stein et al. .................. 455/412 |
| 6,449,344 | B1 | * | 9/2002 | Goldfinger et al. ...... 379/88.17 |
| 6,535,586 | B1 | * | 3/2003 | Cloutier et al. .......... 379/88.13 |

| | | | |
|---|---|---|---|
| 2002/0087643 | A1 | 7/2002 | Parsons et al. ............. 709/206 |

FOREIGN PATENT DOCUMENTS

| | | |
|---|---|---|
| EP | 0 679 005 A1 | 10/1995 |
| EP | 0 856 979 A2 | 8/1998 |
| EP | 0 944 004 A1 | 9/1999 |

OTHER PUBLICATIONS

"Accessing Messages Your Way," AT&T Technology, XP-000530274, 10 (1995) spring, No. 1, New York, US, 2 pages.
"AOL & Microsoft Fight Over Instant Messaging Continues," XP-002188386, Jul. 26, 1999, 1 page.

* cited by examiner

*Primary Examiner*—Jeffrey Pwu
*Assistant Examiner*—J. Bret Dennison
(74) *Attorney, Agent, or Firm*—Haverstock & Owens LLP

(57) ABSTRACT

A more efficient message notification system utilizing technology found in Instant Messaging Services. The more efficient system is achieved by first registering a Message Notification Application with an Instant Messaging Service. A user logs onto the Instant Messaging Service and indicates to the Message Notification Application that the user would like to be notified when new messages arrive. The Message Notification Application then adds the user to its own buddy list. The user is notified by the Message Notification Application through the Instant Messaging Service when a message is received. The user can then retrieve messages through an internet appliance with sound capabilities, or by utilizing the voice-to-text conversion capabilities of the application from the voice messaging or unified messaging server, or by more traditional methods such as a telephone.

25 Claims, 1 Drawing Sheet

INSTANT MESSAGE NOTIFICATION APPLICATION

RELATED APPLICATIONS

This application claims priority under 35 U.S.C. § 119(e) of the co-pending U.S. provisional application Ser. No. 60/169,735 filed on Dec. 8, 1999 and entitled "PATENT SUBMISSION MESSAGING NOTIFICATION." The provisional application Ser. No. 60/169,735 filed on Dec. 8, 1999 and entitled "PATENT SUBMISSION MESSAGING NOTIFICATION" is also hereby incorporated by reference.

FIELD OF THE INVENTION

The present invention relates to the field of providing more efficient message notification and delivery. More particularly, the present invention relates to the field of providing new Instant Message notification where and when the user is most likely to see and/or hear notification and allowing the recipient to instantly be aware of and review new messages.

BACKGROUND OF THE INVENTION

Instant Messaging provides instant communication with another individual or group of individuals utilizing the Internet as a medium and an Internet Appliance (defined here in a more generic sense to mean a desktop PC, a laptop, a simplified PC for Internet connectivity, an Internet phone (WAP phone), a Personal Digital Assistant such as a Palm VII®, a 2-way pager, etc.) as an input/output device.

Instant Messaging services are offered by a number of internet service providers for use by their users. Instant Messaging technology is also very often utilized by the service provider to contact the user about service information as well as for advertising purposes. When a user is utilizing the Instant Messaging Service, a window is brought up onto the user's screen. The window includes many items, including a message line, a dialog box and a buddy list. The buddy list is a user-created collection of possible instant messaging recipients. Instant messaging applications only allow individuals using the same internet service provider to be included on a buddy list.

When a user has access has access to the Internet Messaging Service and a member of their buddy list logs onto the Instant Messaging service, the user can be notified in a number of possible ways. For instance, a user can be notified visually by an icon, by a chime or any other user-selected sound notification. In other words, the buddy list allows a user to keep track of the Internet activity of possible Instant Messaging recipients, thus letting the user know when her buddies come online or go offline.

When a user wishes to send an Instant Message to someone on her buddy list, the user selects the desired address from the buddy list and enters her message into a dialog box. When the user presses the send button, a window immediately opens on the screen of the recipient with the Instant Message. This window will remain open until it is closed by either user. The recipient can then respond by entering a message into the dialog box and pressing send. This continues as long as both individuals wish to have a conversation.

Instant Messaging Services are a popular form of communication for a number of reasons. First, the immediate nature of the message delivery is desirable for responses that are needed right away. On the same token, an Instant Messaging Service is a much quicker means of communication than even e-mail. In addition, Instant Messaging users can carry on two conversations at once, and unlike a telephone call, the connection is free.

Other features that are available to an Instant Messaging user include being able to block another user from detecting whether you are online or offline, or being able to block certain individuals from communicating with you. Instant Messaging Services also can feature indicators which tell a user that a certain recipient is not available upon dispatch to that recipient. Most Instant Messaging Services also provide user directories, where a user can choose whether her user name is listed.

Another topic which must be addressed for the purpose of this disclosure is that of message notification systems. Message notification systems are utilized to alert an individual when they have voice, e-mail or fax messages. Examples of current notification methods include a "message waiting" indication light on a phone, "stutter" dial tone on a home phone, an icon or short message on a wireless handset's display, a numeric message to a pager and numerous others.

All of the aforementioned methodologies are in many instances ineffective in that the systems generating the notification cannot detect whether the user is present. Two main problems arise with a high level of frequency. First, in the event that a user is away from her phone or notification device for a long period of time, important messages that require timely responses become obsolete. To alleviate the problem, some systems allow users to "broadcast" notification using several of these methodologies successively. But this is typically more costly to implement, and not necessarily more efficient since the user must anticipate and tell the system beforehand when and where he or she might be reached. It can also become quite annoying for the user to get notified several times of the same new message.

SUMMARY OF THE INVENTION

The present invention is a method of providing message notification for a user through an Instant Messaging Service. The present invention first registers a Message Notification Application to the Instant Messaging Service. A user utilizing the Instant Messaging Service then signs up for the Message Notification Application, thus indicating to the Message Notification Application that the user wishes to be notified when any messages are received. The Message Notification Application will then add the user to its own buddy list.

After the user is registered with the Message Notification Application and a message arrives for the user, the Message Notification Application sends an instant message to the user notifying the user of the new mailbox message as soon as the user is on-line. The instant message can include the new mailbox message's envelope. Then, upon the user's request, the messages can be deleted immediately or retrieved from a message server using an internet appliance such as a personal digital assistant, a personal computer or any other internet-connected device or saved for later retrieval. The server in this case can be an application, voice messaging or unified messaging server.

DETAILED DESCRIPTION OF THE PREFERRED EMBODIMENT

Figure 1:
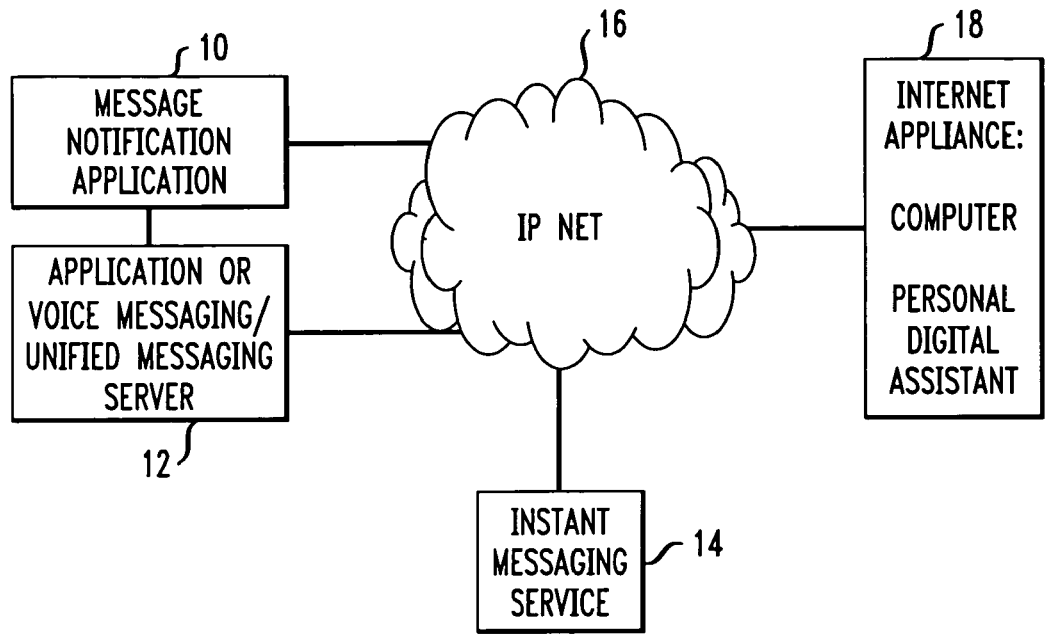
FIG. 1 illustrates a block diagram of the preferred embodiment of the present invention.

In the preferred embodiment of the present invention (FIG. 1) a Message Notification Application (Notification Application) 10 is registered to an Instant Messaging Service (Messaging Service) 14 through an IP Network 16 such as the Internet or a private intranet. A user who is already signed up for the Messaging Service 14 indicates to the Notification Application 10 that she would like to be notified when new messages arrive. The user can utilize one of many Messaging Services 14 currently available to the public such as, but not limited to, AOL Instant Messenger®, MSN Messenger®, Yahoo! Messenger®, ICQ® or any privately-provided instant messaging service. When a number of users utilizing various Messaging Services 14 are signed up for the Notification Application 10, the Notification Application 10 can be registered with multiple Messaging Services 14 to enable it to talk with users regardless of the Messaging Service 14 they are utilizing.

Figure 2:
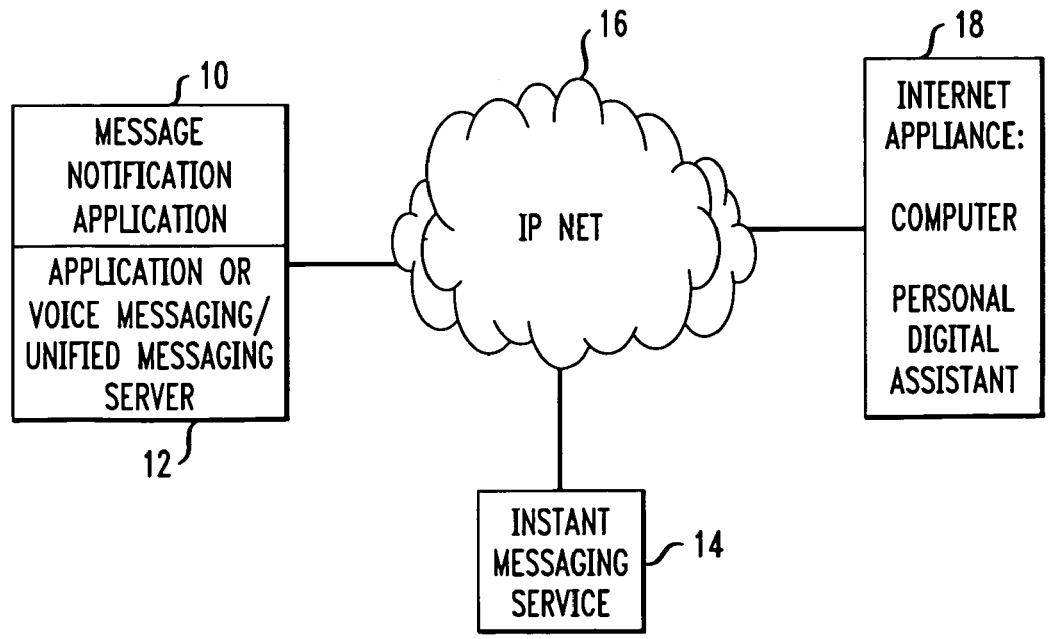
FIG. 2 illustrates a block diagram of an alternative embodiment of the present invention.

The Notification Application 10 of the preferred embodiment operates on one of an Application, Voice Messaging or Unified Server (Server) 12. The preferred embodiment of the present invention includes the Notification Application 10 and the Server 12 as two separate physical components. Alternative embodiments such as that depicted in FIG. 2, can utilize the Notification Application 10 and the Server 12 in the same physical location.

Again referring to FIG. 1, when a user accesses the IP Network 16 using an Internet Appliance 18, the user then logs onto the Messaging Service 14. The preferred embodiment of the present invention utilizes a computer as the Internet Appliance 18 for the user to perform this task. However, alternative embodiments of the present invention utilize any Internet-connected device as the Internet Appliance 18 for the user to access the IP Network 16, for instance a Personal Digital Assistant or a digital cellular phone. A voice-to-text converter is implemented in the Notification Application 10 to allow a user to retrieve and read voice messages on an alternative embodiment of an Internet Appliance 18 having no sound capabilities (such as a Personal Digital Assistant).

Also in the preferred embodiment, after logging onto the Messaging Service 14, the user instructs the Notification Application 10 that she wishes to be notified when a new message is received. The Notification Application 10 then adds the user to its own buddy list. As previously stated, the buddy list is a user-created collection of possible Instant Messaging recipients. Adding the user to the Notification Application 10 buddy list allows the Notification Application 10 to alert the user through the Messaging Service 14 of any messages in the user's message mailbox. Here, unlike previous Instant Messaging implementations, the application creates multiple buddy lists with multiple internet service providers to identify who is online and offline regardless of the Internet service provider or Instant Messaging Service employed by the user.

The Messaging Service 14 alerts the user of any new messages by way of an instant message including a message envelope for each new message. The message envelope can include such information as who the message is from, when the message was sent, the subject of the message and whether the message is urgent. Of course the message envelope can include more information or less. This information allows the user to determine if the new message requires immediate response, can be accessed later or can be deleted.

Also in the preferred embodiment of the present invention, when the user is notified through the Messaging Service 14 by the Notification Application 10 of a mail message in his mailbox, the user may access the Server 12 to retrieve these messages. To do this, the user makes a request to the Notification Application 10 using an Internet Appliance 18 or traditional methods such as a telephone to directly access the Server 12. The Server 12 then relays the user's messages to him through a telephone connection or through the Notification Application 10 by means of a sound file that the user can listen to with PC speakers, or read in alternative embodiments, by way of a voice-to-text converter. The preferred embodiment of the present invention does not limit the mail messages to voice mail messages only. All embodiments can provide instant message notification and delivery for a variety of message types such as, but not limited to, voice, e-mail and fax mail messages.

The main benefit of this invention is that it follows the user wherever that user happens to be, and automatically redirects notification messages to whatever device is in use and tailors the message so that the user can access the message using a variety of methods. In other words, regardless of the Internet Appliance 18 used, as long as the user logs onto his Messaging Service 14, he will be notified of any message and be able to retrieve them.

Another benefit is that notification is standardized to all end user points and devices that are compatible with a specific Messaging Service 14. The Notification Application 10 itself does not need to be aware of the specifics these end user points because it merely needs to be instructed how to interact with the Messaging Service 14 framework and offer the message in multiple formats (e.g. sound file, text, etc.).

This invention has been described in terms of specific embodiments incorporating details to facilitate the understanding of the principles of construction and operation of the invention. Such reference herein to specific embodiments and the details thereof is not intended to limit the scope of the claims and hereto. It will be apparent to those of ordinary skill in the art that modifications can be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the before embodiment invention and is in no way a limitation.

We claim:

1. A method of providing message notification for a user comprising the steps of:
   a. coupling a message notification application to a server, wherein the server stores messages for the user;
   b. registering the message notification application to at least one instant messaging service;
   c. accessing one of the at least one instant messaging service by the user;
   d. signing the user onto the message notification application by adding the user to a buddy list of the message notification application thereby associating the user to the one instant messaging service which the user is currently accessing; and
   e. sending an instant message notification from the message notification application via the one instant messaging service to the user when a message arrives on the server for the user.

2. The method as claimed in claim 1 further comprising the step of retrieving the message by accessing the server.

3. The method as claimed in claim 2 wherein the server is one of an application, a voice messaging and a unified messaging server.

4. The method as claimed in claim 2 further comprising the step of accessing the server by one of sending a request to the message notification application and using a telephone.

5. The method as claimed in claim 2 further comprising the step of retrieving messages from the server by an internet appliance.

6. The method as claimed in claim 2 further comprising the step of deleting a message using an internet appliance without retrieving the message from the server.

7. An apparatus for providing message notification and allowing a user to instantly review new messages comprising:
  a. at least one instant messaging service;
  b. a message notification application registered to the at least one instant messaging service, wherein the message notification application includes a buddy list onto which the user is added, thereby associating the user to one of the at least one instant message service that the user is currently using;
  c. a server for storing messages and providing a medium for the message notification application to operate; and
  d. an internet appliance to access the server and receive an instant message notification from the message notification application via the one instant messaging service, the instant message notification indicates that a new message is stored on the server for the user.

8. The apparatus as claimed in claim 7 further comprising means for automatically adding the user to the buddy list of the message notification application in response to the user signing up to receive messages with the message notification application.

9. The apparatus as claimed in claim 7 wherein the message notification application comprises means for sending the user the instant message notification through the one instant messaging service when a message arrives for the user.

10. The apparatus as claimed in claim 7 further comprising means for retrieving the message from the server by one of sending a request to the message notification application and using a telephone.

11. The apparatus as claimed in claim 7 wherein the server is one of an application, a voice messaging and a unified messaging server.

12. The apparatus as claimed in claim 7 further comprising means for deleting the message using the internet appliance without retrieving the message from the server.

13. A message notification system that allows the user to instantly review new messages comprising:
  a. at least one instant messaging service;
  b. a message notification application registered to the at least one instant messaging service, wherein the message notification application includes a buddy list onto which the user is added, thereby associating the user to one of the at least one instant message service that the user is currently using;
  c. a server for storing messages and providing a medium for the message notification application to operate; and
  d. an internet appliance to access the server and receive an instant message notification from the message notification application via the one instant messaging service, the instant message notification indicates that a new message is stored on the server for the user.

14. The message notification system as claimed in claim 13 further comprising means for automatically adding the user to the buddy list of the message notification application in response to the user signing up to receive messages with the message notification application.

15. The message notification system as claimed in claim 13 wherein the message notification application comprises means for sending the user the instant message notification through the one instant messaging service when a message arrives for the user.

16. The message notification system as claimed in claim 13 further comprising means for retrieving the message from the server by one of sending a request to the message notification application and using a telephone.

17. The message notification system as claimed in claim 13 wherein the server is one of an application, a voice messaging and a unified messaging server.

18. The message notification system as claimed in claim 13 further comprising means for deleting the message using the internet appliance without retrieving the message from the server.

19. A message notification system for a user comprising:
  a. means for coupling a message notification application to a server, wherein the server stores messages for the user;
  b. means for registering the message notification application to at least one instant messaging service;
  c. means for accessing one of the at least one instant messaging service by the user:
  d. means for signing the user onto the message notification application by adding the user to a buddy list of the message notification application thereby associating the user to the one instant messaging service which the user is currently accessing; and
  e. means for sending an instant message notification from the message notification application via the one instant messaging service to the user when a message arrives on the server for the user.

20. The message notification system as claimed in claim 19 further comprising means for the user to retrieve the message by accessing the server.

21. The message notification system as claimed in claim 20 wherein the server is one of an application, a voice messaging and a unified messaging server.

22. The message notification system as claimed in claim 20 wherein the user accesses the server by one of sending a request to the message notification application and using a telephone.

23. The message notification system as claimed in claim 20 wherein the message is retrieved from the server by an internet appliance.

24. The message notification system as claimed in claim 20 further comprising the step of deleting the message using the internet appliance without retrieving the message from the server.

25. A method of providing a voice messaging notification application for a user in an instant messaging system comprising the steps of:
  a. coupling a message notification application to a server, wherein the server stores messages for the user;
  b. registering the message notification application to at least one instant messaging service;
  c. accessing one of the at least one instant messaging services by the user;
  d. adding the user to a buddy list of the message notification application, wherein the buddy list is associated with the one instant messaging service;
  e. sending an instant message notification to the user from the message notification application via the one instant messaging service when a message arrives on the server for the user; and
  f. allowing the user access to a server by one of using an internet appliance and using a telephone.

\* \* \* \* \*